US 8,952,966 B2

(12) United States Patent
Mohammad et al.

(10) Patent No.: US 8,952,966 B2
(45) Date of Patent: Feb. 10, 2015

(54) MULTIPLE ELEMENT SELECTIONS IN GANTT CHARTS

(75) Inventors: Imran Mohammad, Westford, MA (US); Hendrik van den Broek, Lexington, MA (US); Chadwick Chow, Woburn, MA (US); Diar Ahmed, East Walpole, MA (US)

(73) Assignee: Oracle International Corporation, Redwood Shores, CA (US)

( * ) Notice: Subject to any disclaimer, the term of this patent is extended or adjusted under 35 U.S.C. 154(b) by 706 days.

(21) Appl. No.: 13/224,585

(22) Filed: Sep. 2, 2011

(65) Prior Publication Data

US 2012/0306887 A1  Dec. 6, 2012

Related U.S. Application Data

(60) Provisional application No. 61/493,757, filed on Jun. 6, 2011.

(51) Int. Cl.
*G06T 11/20* (2006.01)
*G09G 5/22* (2006.01)
*G06Q 99/00* (2006.01)

(52) U.S. Cl.
CPC .............. *G06Q 99/00* (2013.01); *G06T 11/206* (2013.01)
USPC ........................................ 345/440; 345/440.2

(58) Field of Classification Search
USPC ............ 345/440, 440.2; 705/8, 5, 9; 717/105; 709/203; 715/749
See application file for complete search history.

(56) References Cited

U.S. PATENT DOCUMENTS

| 6,674,450 | B1 * | 1/2004 | Toub et al. ................. 715/749 |
| 7,114,126 | B2 | 9/2006 | Berger et al. |
| 7,249,356 | B1 | 7/2007 | Wilson et al. |
| 7,330,822 | B1 | 2/2008 | Robson et al. |
| 7,546,577 | B2 | 6/2009 | Do et al. |
| 8,674,994 | B2 | 3/2014 | Mohammad et al. |
| 2005/0039163 | A1 * | 2/2005 | Barrett et al. ............... 717/105 |
| 2006/0004618 | A1 | 1/2006 | Brixius |
| 2006/0123331 | A1 | 6/2006 | Hightower et al. |
| 2007/0150327 | A1 | 6/2007 | Dromgold |
| 2008/0027776 | A1 | 1/2008 | Sourov et al. |
| 2008/0270929 | A1 | 10/2008 | Bohn et al. |
| 2009/0249215 | A1 | 10/2009 | Paek |
| 2009/0327403 | A1 * | 12/2009 | Bhat et al. ................... 709/203 |
| 2010/0299171 | A1 * | 11/2010 | Lau et al. ......................... 705/8 |

(Continued)

OTHER PUBLICATIONS

U.S. Appl. No. 13/193,924, Final Office Action mailed on Sep. 9, 2013, 17 pages.

(Continued)

*Primary Examiner* — Chante Harrison
(74) *Attorney, Agent, or Firm* — Kilpatrick Townsend & Stockton LLP

(57) ABSTRACT

Various arrangements for manipulating multiple elements of a Gantt chart are presented. The Gantt chart may be generated comprising a plurality of elements distributed across a plurality of groups. A selection of a subset of elements from the plurality of elements may be received, wherein the subset of elements of the Gantt chart comprises elements from at least a first group and a second group of the plurality of groups of the Gantt chart. An application programming interface may be executed to retrieve an element identifier for each element of the subset of elements of the Gantt chart, wherein each element identifier corresponds to only one element of the Gantt chart.

20 Claims, 8 Drawing Sheets

(56) References Cited

U.S. PATENT DOCUMENTS

| 2010/0302260 | A1 | 12/2010 | De Lissandri |
| 2011/0265188 | A1 | 10/2011 | Ramaswamy et al. |
| 2011/0320319 | A1 | 12/2011 | Streich |
| 2012/0198390 | A1 | 8/2012 | Bogusky et al. |
| 2012/0306880 | A1 | 12/2012 | Mohammad et al. |

OTHER PUBLICATIONS

U.S. Appl. No. 13/193,924, Non Final Office Action mailed on Jun. 14, 2013, 14 pages.
U.S. Appl. No. 13/193,924, Notice of Allowance mailed on Dec. 30, 2013, 29 pages.
Author Unknown, "DlhSoft Gantt Chart Library for Windows® Forms 2.0," DlhSoft, retrieved Apr. 13, 2011 from: http://dlhsoft.com/GanttChartLibrary/2.0/Horne.aspx, Copyright 2004, 2 pages.
Author Unknown, "dhtmlxGantt," DHTMLX Ltd., retrieved Nov. 9, 2011 from: http://docs.dhtmlx.com/doku.php?id=dhtmixgantt:toc, Copyright 1998, 2 pages.
Author Unknown, "Editable JavaScrit Gantt Chart with Rich Script API," DHTMLX Ltd., retrieved Nov. 9, 2011 from: http://dhtmlx.com/docs/products/dhtmixGantt/index.shtml, Copyright 1998, 2 pages.
Author Unknown, "Format the bar chart portion of a Gantt view," Microsoft Corporation, retrieved Apr. 14, 2011 from http://office.microsoft.com/en-us/project-help/format-the-bar-chart-portion-of-a-gantt-view-HA001225368.aspx, Copyright 2011, 4 pages.
Author Unknown, "IBM ILOG JViews Gantt 8.7 API," IBM, retrieved Apr. 11, 2011 from: http://publib.boulder.ibm.com/infocenter/jviewent/v8r7/index.jsp?topic=/com.ibm.ilog.jviews.gantt.doc/html/refjava/html/ilog/views/gantt/llvGanttConfiguration.html, Copyright 1996, 41 pages.
Author Unknown, "JIDE Gantt Chart Developer Guide" JIDE Software, retrieved Nov. 9, 2011 from: http://www.jidesoft.com/products/JIDE_Gantt_Chart_Developer_Guide.pdf, Copyright 2002, 10 pages.
Author Unknown, "JSGantt," API JSGANTT, retrieved Apr. 13, 2011 from: http://www.jsgantt.com/docs/JSGantt..html, Copyright 2009 Yahoo! Inc., 3 pages.
Author Unknown, "JSGantt.GanttChart," JSGantt API, retrieved Apr. 14, 2011 from: http://www.jsgantt.com/docs/JSGantt.GanttChart.html#method_drawDependency, Copyright 2009 Yahoo! Inc., 4 pages.
Author Unknown, "The Product Features of Our Gantt Software VARCHART XGantt," NETRONIC, retrieved Apr. 14, 2011 from: http://www.netronic.com/gantt/gantt-software/gantt-chart-software.html, Copyright TYPO3 Agentur, 8 pages.
Author Unknown, "TILOS 7 Improves the Gantt Chart," Linear project GmbH, retrieved Nov. 9, 2011 from: http://www.tilos.org/fileadmin/downloads/doc/T7/Whats-new-in-TILOS7.pdf, 8 pages.
Author Unknown "VARCHART JGantt—Overview," NETRONIC, retrieved Apr. 7, 2011 from: http://www.netronic.com/gantt/gantt-charts.html, 2 pages.
Gantz, et al., "100% Free Javascript / CSS/ HTML Gantt chart control. Completely buzzword compliant including AJAX !", jsGantt 1.2, retrieved Apr. 13, 2011 from: http://www.jsgantt.com/, 3 pages.
U.S. Appl. No. 13/193,924, filed Jul. 29, 2011, Office Action mailed on Aug. 20, 2012, 13 pages.
Microsoft, "Format the bar chart portion of a Gantt view," Microsoft Corporation, Retrieved on Aug. 13, 2012 from http://office.microsoft.com/en-us/project-help/format-the-bar-chart-portion-of-a-gantt-view-HA001225369.aspx, Copyright 2010, 6 pages.
U.S. Appl. No. 13/193,924, filed Jul. 29, 2011, Final Office Action mailed on Jan. 22, 2013, 22 pages.
U.S. Appl. No. 13/193,924, filed Jul. 29, 2011, Advisory Action mailed on Mar. 29, 2013, 13 pages.

* cited by examiner

MULTIPLE ELEMENT SELECTIONS IN GANTT CHARTS

CROSS REFERENCES

This application claims priority to Pat. Appl. No. 61/493,757, filed Jun. 6, 2011 in the United States, entitled "Retrieving Selections in Gantt Charts." This provisional application is incorporated in its entirety for all purposes. This application is related to patent application Ser. No. 13/193,924, filed Jul. 29, 2011 in the United States, entitled "Presentation of Dependencies in Gantt Charts." This application is also incorporated in its entirety for all purposes.

BACKGROUND

Gantt charts may be used to illustrate schedules and resource utilization. For example, pertaining to a schedule, a Gantt chart can illustrate the start and finish dates of various tasks of a project. A resource utilization Gantt chart can present time buckets that illustrate the utilization of a resource for a period of time. A user interacting with a Gantt chart may desire to select an element (e.g., a time bucket or task) to view and/or modify the element's characteristics. If the end-user desires to view and/or modify multiple elements, the end-user may need to interact with each element individually. Such interaction with individual elements of a Gantt chart may be time consuming. Similarly, application developers who create Gantt chart-related software may not have the framework available that allows multiple elements of a Gantt chart to be interacted with concurrently.

SUMMARY

Various systems, methods, and computer program products for manipulating multiple elements of a Gantt chart are presented. A method for manipulating multiple elements of a Gantt chart may be presented. The method may include generating the Gantt chart comprising a plurality of elements distributed across a plurality of groups. The method may include receiving a selection of a subset of elements from the plurality of elements. The subset of elements of the Gantt chart may comprise elements from at least a first group and a second group of the plurality of groups of the Gantt chart. The method may include executing a first application programming interface to retrieve an element identifier for each element of the subset of elements of the Gantt chart, wherein each element identifier corresponds to only one element of the Gantt chart.

Embodiments may include one or more of the following: The method may include receiving a modification to be applied to each element of the subset of elements. The method may include executing a second application programming interface using the element identifiers of the subset of elements to apply the modification to each element of the subset of elements. The plurality of elements may be a plurality of tasks. The modification may comprise altering a date for each of the subset of elements. The method may include executing a second application programming interface using the element identifiers of the subset of elements to retrieve information about the subset of elements. Each group of the plurality of groups of the Gantt chart may be a row of the Gantt chart. The first group may comprise at least one element of the plurality of elements that is not selected. The plurality of elements may be a plurality of time buckets.

In some embodiments, a computer program product residing on a non-transitory processor-readable medium and comprising processor-readable instructions is presented. The processor-readable instructions may comprise instructions configured to cause a Gantt chart comprising a plurality of elements distributed across a plurality of groups to be generated. The processor-readable instructions may comprise instructions configured to cause the processor to receive a selection of a subset of elements from the plurality of elements. The subset of elements of the Gantt chart may comprise elements from at least a first group and a second group of the plurality of groups of the Gantt chart. The processor-readable instructions may comprise instructions configured to cause the processor to execute a first application programming interface to retrieve an element identifier for each element of the subset of elements of the Gantt chart, wherein each element identifier corresponds to only one element of the Gantt chart.

In some embodiments, a system for manipulating multiple elements of a Gantt chart is presented. The system may include a processor. The system may also include a memory communicatively coupled with and readable by the processor and having stored therein a series of processor-readable instructions. The instructions, when executed by the processor, cause the processor to cause the Gantt chart comprising a plurality of elements distributed across a plurality of groups to be generated. The instructions, when executed by the processor, cause the processor to receive a selection of a subset of elements from the plurality of elements. The subset of elements of the Gantt chart may comprise elements from at least a first group and a second group of the plurality of groups of the Gantt chart. The instructions, when executed by the processor, cause the processor to execute a first application programming interface to retrieve an element identifier for each element of the subset of elements of the Gantt chart, wherein each element identifier corresponds to only one element of the Gantt chart.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
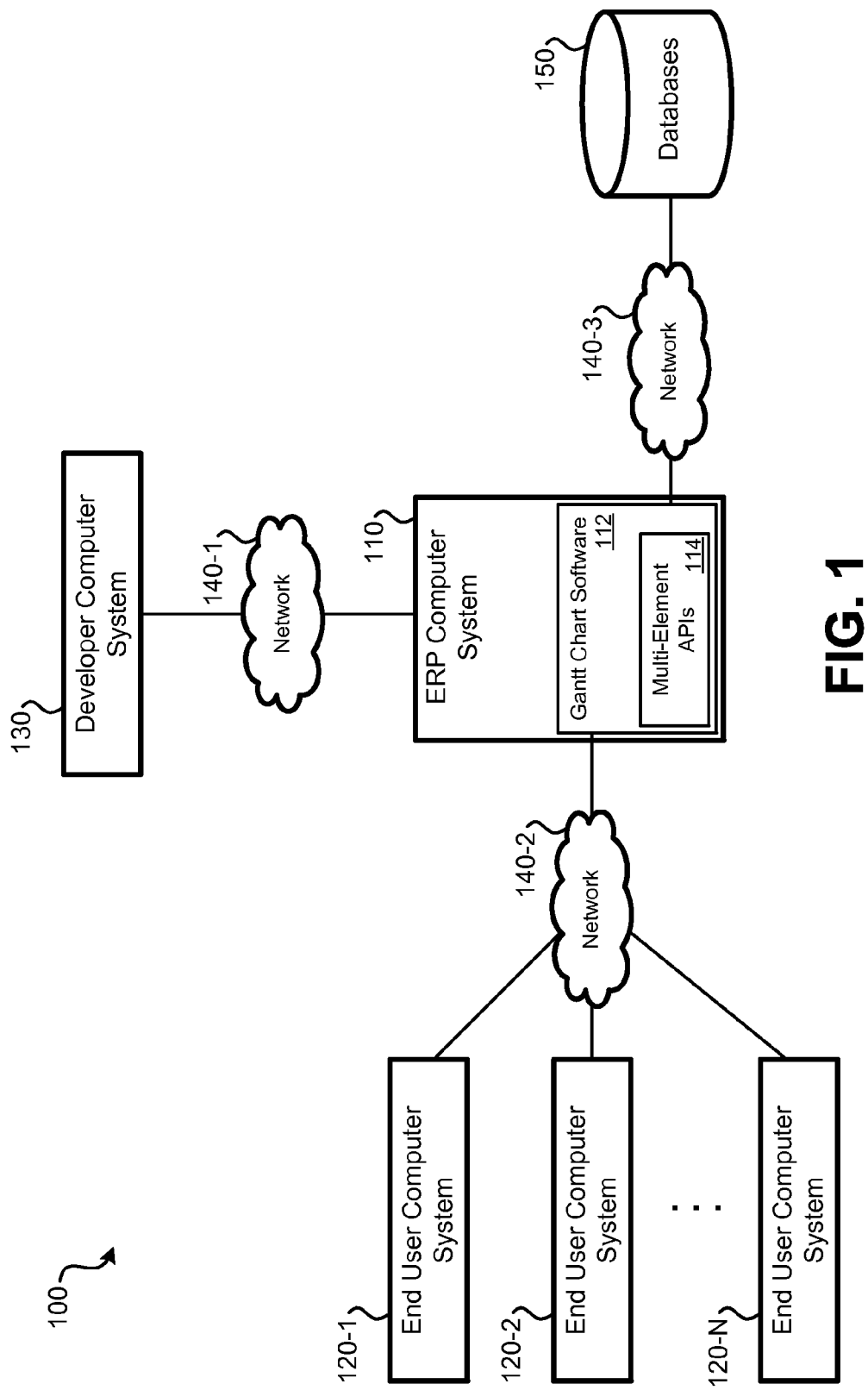
FIG. 1 illustrates an embodiment of a system configured to permit multiple Gantt chart elements to be interrogated concurrently.

When viewing and/or modifying elements in a Gantt chart, typically only a single element (e.g., a single task or a single time bucket) or entire group (e.g., a row in a scheduling Gantt chart) can be selected and interrogated at one time. Referring to a scheduling Gantt chart, each row may contain elements, referred to as tasks, that indicate an allocation of a resource for a length of time. For example, each row in a scheduling Gantt chart may represent a schedule for an employee of a company. Various tasks assigned to that employee may occupy portions of the employee's row. A resource utilization Gantt chart may include time buckets that summarize the utilization of a particular resource for a period of time. Each time bucket may represent a summary of utilization data for a period of time, such as a week. For example, in a resource utilization Gantt chart, each row may correspond to a particular employee of a company, with each column corresponding to a particular day. A time bucket may exist for each employee for each day. Each time bucket may present the utilization of the employee for the given day.

Typically, multiple elements of a scheduling or resource allocation Gantt chart may not be interrogated concurrently. Only interrogation (e.g., selection and modification) of each element individually, rather than interrogation of a selected group as a whole, is possible. Such interrogation of each element separately may be more time consuming and less efficient than interacting with the desired group of elements as a whole. For example, a developer may desire for end-users to be able to modify a same characteristic of multiple elements displayed on a Gantt chart concurrently; however, without application programming interfaces available to allow for interrogation of multiple elements of the Gantt chart at the same time, developers may not be able to implement features that require interaction with multiple elements concurrently. Concurrent interaction with multiple elements may be defined as invoking an API that is configured to accept multiple elements as an input to the API or that is configured to return data related to multiple elements of a Gantt chart as output from the API.

Various embodiments described herein allow for multiple elements of a Gantt chart to be interrogated concurrently. The selection of multiple elements may allow for information about the selected elements to be viewed together. The selection of multiple elements may also allow for one or more characteristics of each of the selected elements to be modified similarly. In order to allow multiple elements of a Gantt chart to be selected concurrently, each element in the Gantt chart may need to be individually identifiable. As such, identifiers that correspond to particular elements of the Gantt chart may be used. Each element's identifier may be unique from identifiers corresponding to other elements of the same Gantt chart. As such, an identifier may be used to identify a particular element in a Gantt chart. Such an identifier may be referred to as a row-key.

Based on a selection of elements of a Gantt chart, one or more application programming interfaces (APIs) may be used to allow an end-user to manipulate multiple elements. Such API's may be made available to software developers through a development framework used to develop enterprise-level software products, such as the Oracle Application Development Framework (ADF). A first API may allow for the retrieval of multiple row-keys associated with the selected elements of a Gantt chart. A second API may allow for characteristics of an element to be retrieved using the row-key. A third API may allow for the row-key of the most recently selected element to be retrieved. A fourth API may allow multiple elements to be selected based on a set of provided row-keys.

FIG. 1 illustrates an embodiment of a system 100 configured to permit multiple Gantt chart elements to be interrogated concurrently. System 100 includes: ERP computer system 110, end-user computer systems 120, developer computer system 130, networks 140, and databases 150. ERP computer system 110 may include one or more computer servers that execute software capable of viewing, creating, and/or modifying Gantt charts. ERP computer system 110 may be used to execute one or more enterprise-level applications, which may be accessed by end-users via one or more end-user computer systems 120. FIG. 1 illustrates ERP computer system 110 executing Gantt chart software 112, however it should be understood that additional enterprise software applications may also be executed by ERP computer system 110. Further, while FIG. 1 illustrates ERP computer system 110 executing Gantt chart software 112, it should be understood that in some embodiments Gantt chart software 112 may be fully or partially executed locally by end-user computer systems 120. Gantt chart software 112 may be created or modified by a software developer. Multi-element API's described herein may be used in conjunction with Gantt chart software 112 to permit multiple elements to be interrogated concurrently (that is, interrogated via a single command from an end-user and not require a command to be reiterated by the end-user for each element).

ERP computer system 110 may be in communication with one or more local and/or remote databases. In the illustrated embodiment of system 100, ERP computer system 110 is in communication with remote databases 150. Information stored in databases 150 may be related to the operations of the entity (e.g., the company) on whose behalf ERP computer system 110 is operated. Information from databases 150 may be used to populate some or all of the elements of Gantt charts displayed using Gantt chart software 112.

One or more end-user computer systems 120 may be in communication with ERP computer system 110. From each end-user computer system of end-user computer systems 120, an end-user may be able to interact with Gantt chart software 112 executed by ERP computer system 110. In some embodiments, Gantt chart software 112 may be fully or partially executed locally by end-user computer systems 120. In such embodiments, end-user computer systems 120 may communicate with ERP computer system 110 to access databases 150. The illustrated embodiment of system 100 contains three end-user computer systems (120-1, 120-2, and 120-N). More or fewer end-user computer systems 120 may be in communication with ERP computer system 110.

Also in communication with ERP computer system 110 may be developer computer system 130. Developer computer system 130 may be operated by a developer and/or system administrator. The developer (who may be a user of ERP computer system 110) may write code that provides certain functionality for end-users. For example, a developer, using developer computer system 130, may create, configure, and/or modify Gantt chart software 112. A developer can create, configure, or modify Gantt chart software 112 that uses various multi-element API's 114 to interrogate elements of the Gantt chart. In some embodiments, rather than developer computer system 130 being in communication with ERP computer system 110, software modified or created by the developer may be loaded onto ERP computer system 110 and/or end-user computer systems 120.

One or more multi-element API's 114 may be part of, or be used by, Gantt chart software 112. Multi-element API's 114 may permit Gantt chart software 112 to interrogate multiple elements at the same time. For example, an element displayed on a Gantt chart may be linked with a data entry in databases 150. This data entry (which may be a row) may have one or more fields, such as: a task identifier, a name, a start date, an end date, and a resource. When a change is made to the element of the Gantt chart, the data entries in databases 150 may be updated. Multi-element API's 114 may be used to interrogate multiple elements of the Gantt chart, and allow viewing and/or modification of the corresponding data entries within databases 150. Multi-element API's 114 may use an identifier that is unique to a particular element of the Gantt chart from other elements of the Gantt chart. As such, by using the identifier, which may be referred to as a row-key, a particular element of the Gantt chart can be identified. Similarly, if a particular element of the Gantt chart is selected, a particular row-key that corresponds to that element can be retrieved.

Developer computer system 130 may communicate with ERP computer system 110 via network 140-1. Network 140-1 may represent one or more public and/or private networks. For example, a public network may be the Internet. An example of a private network is a corporate intranet. Similarly, end-user computer systems 120 communicate with ERP computer system 110 via network 140-2. Network 140-2 may represent the same network or a different network from network 140-1. ERP computer system 110 may communicate with one or more databases that are local and/or remote. In the illustrated embodiment of system 100, databases 150 are remote from ERP computer system 110 and communicate with ERP computer system 110 via network 140-3. Network 140-3 may represent the same network or a different network from network 140-1 and network 140-2.

The illustrated embodiment of system 100 illustrates end-user computer systems 120 and developer computer system 130 as distinct from each other. It should be understood that end-user computer systems 120 and the developer computer system 130 may be similar. The difference between end-user computer systems 120 and developer computer system 130 may be that end-users (that use end-user computer systems 120) use pre-developed software while a developer (that uses developer computer system 130) creates and/or modifies the functionality of software related to Gantt charts. As such, whether a user of ERP computer system 110 is considered a developer or an end-user (and whether the user's computer is designated an end-user computer system or a developer computer system) may be based on the computer system's operator.

Figure 2:
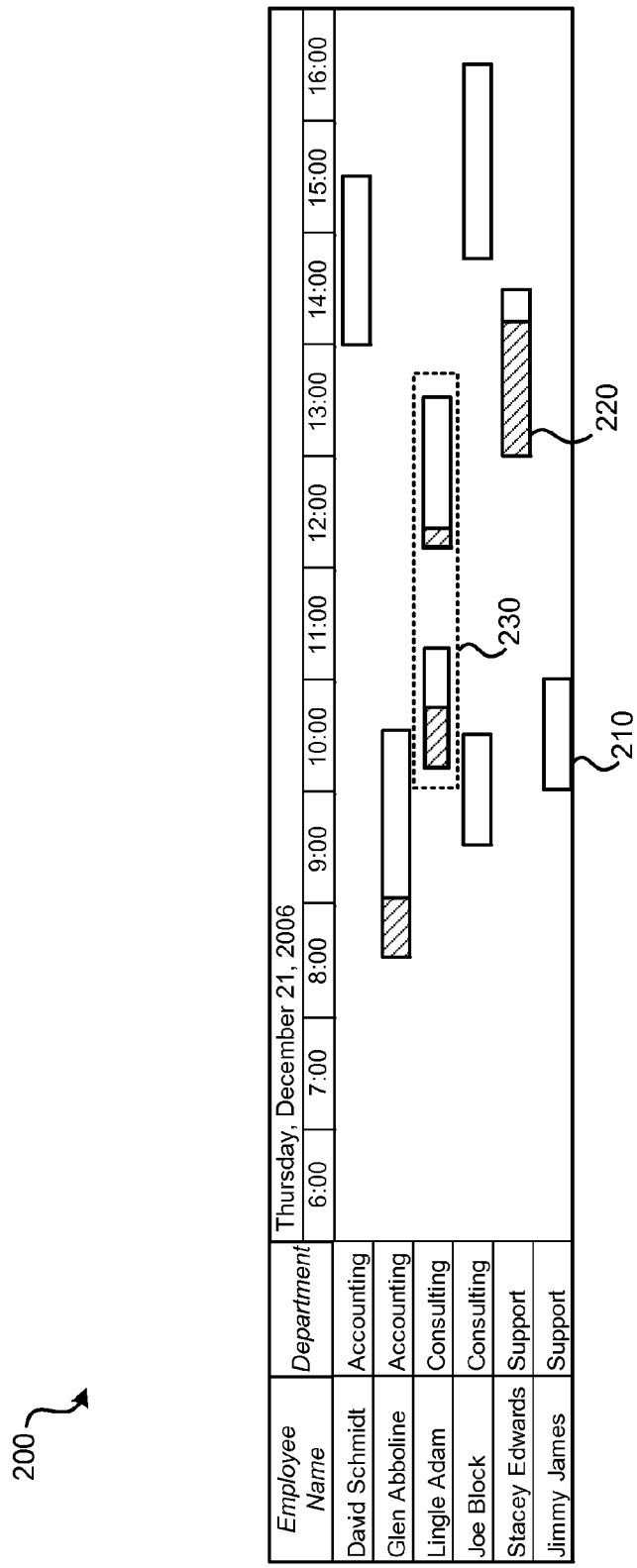
FIG. 2 illustrates an embodiment of an interface displaying a scheduling Gantt chart having no tasks selected.

FIG. 2 illustrates an embodiment of an interface 200 displaying a scheduling Gantt chart without any elements selected. Referring back to FIG. 1, interface 200 may be displayed via one of end-user computer systems 120. Some or all of the processing to create the Gantt chart may be performed by the end-user computer system. In some embodiments, some or all of the processing may be performed by the ERP computer system 110. Gantt chart software 112 may be executed by an end-user computer system of end-user computer systems 120, ERP computer system 110, or partially by both computer systems. Data for elements appearing in the Gantt chart created by Gantt chart software 112 may be retrieved from databases 150. In some embodiments, interface 200 may be created by a system other than system 100 of FIG. 1.

Interface 200 displays a scheduling Gantt chart having eight elements. In each row of the Gantt chart of interface 200, elements, which are tasks, are present. Each row of the Gantt chart corresponds to a particular employee. As such, each employee may be responsible for tasks occurring in the employee's row in the Gantt chart. Element 210 is an example of an element appearing in the Gantt chart of interface 200. Element 210 is assigned to employee Jimmy James. Element 220 is another example of an element. The shading of element 220 may represent the portion of the task that is complete. For example, element 220 is approximately 80% shaded. This may represent that the task is approximately 80% complete. The data used to create each of these elements on the Gantt chart, such as the start time and date, end time and date, the employee to which the tasks are assigned and the percentage complete, may be retrieved from databases 150.

Each element within the Gantt chart of interface 200 may be linked with one or more database entries. By a user selecting an element, such as element 210, the user may be able to view and/or modify various properties of the element and its associated database entry. For example, by a user selecting element 210, such as by clicking on it, the end-user may be presented with additional properties of element 210 and/or may be presented with the opportunity to modify element 210. Characteristics of element 210 that may be modified include characteristics such as the start time and/or date of the element, the end time and/or date of the element (collectively referred to as the dates of the element), and the employee to which element 210 is assigned. Referring to element 220, a characteristic which may be changed could be the percentage complete.

Elements 230 represent two elements present in the same row. Previously, it may not have been possible to select only one of these elements along with one or more additional elements from another row concurrently. As an example of a reason for which one element of elements 230 and an element from another row, such as element 210, may be desired to be selected concurrently, an end-user may desire to reassign such two elements to another employee. Therefore, referring to interface 200, an element formerly assigned to Lingle Adam and an element formerly assigned to Jimmy James could be concurrently selected and have their characteristics edited such that both these tasks are assigned to a new employee. The API's described herein may allow an end-user performing the reassignment to only need to specify the new employee once for both tasks, rather than twice (once for each task).

Figure 3:
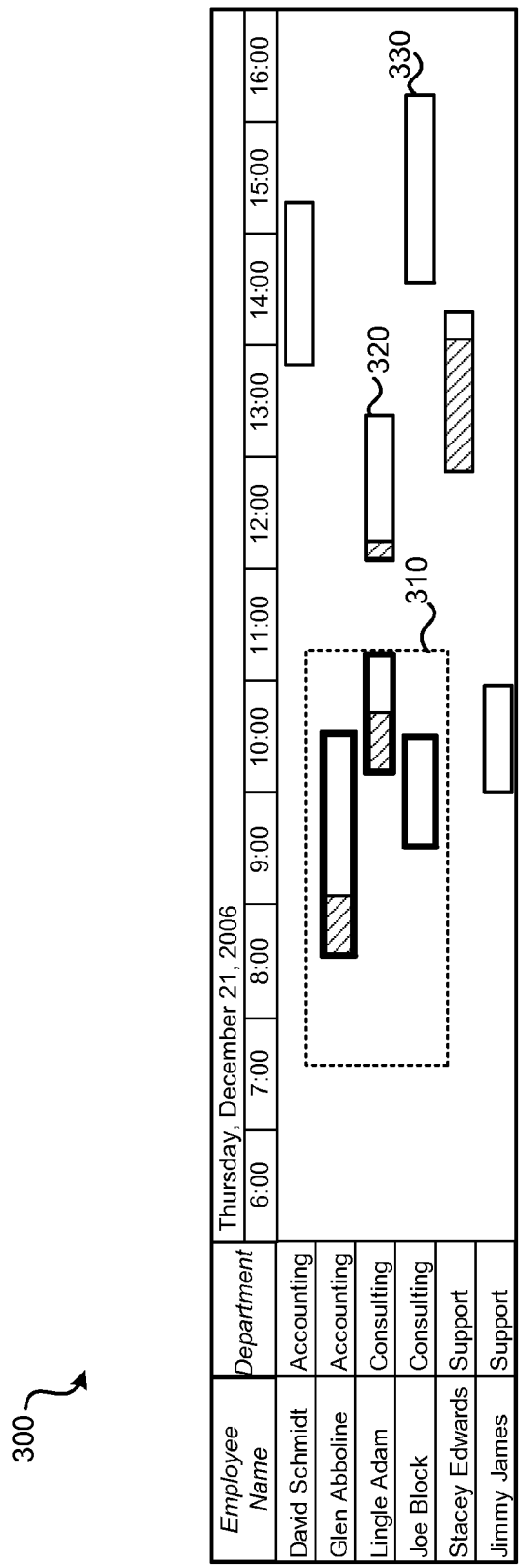
FIG. 3 illustrates an embodiment of an interface displaying a scheduling Gantt chart having multiple tasks selected.

FIG. 3 illustrates an embodiment of an interface 300 displaying a scheduling Gantt chart having three elements selected to be retrieved. Interface 300 may display the same Gantt chart as interface 200 of FIG. 2, with three elements selected.

In interface 300, three elements are selected, as indicated by the bold outlining of each selected element in selected group 310. To create such a selection, an end-user may click on each element in selected group 310. In order for each element of selected group 310 to remain selected, the user may hold down a key, such as control, on the end-user computer system being operated by the end-user while making the selection. It should be understood by those with skill in the art that other ways of an end-user providing input to an end-user computer system to specify which elements of the Gantt chart are to be selected are possible.

Each element within the Gantt chart of interface 300 may be assigned an identifier different from identifiers assigned to other elements of the same Gantt chart. As such, based on an identifier, a particular element can be identified. Similarly, when a particular element is selected, a corresponding identifier can be identified. This identifier may, in some embodiments, be referred to as a row-key.

Various application programming interfaces (APIs) may be used in conjunction with Gantt chart software to allow for the interrogation of multiple elements of a Gantt chart concurrently. Such API's may be available via a framework used for creating software. One API may be referred to as "getSelectedTaskRow-keys( )" This API may return a set of identifiers of the selected tasks in a scheduling Gantt chart. As such, executing this API when the elements of selected group 310 are selected may result in a set of the identifiers (e.g., row-keys) corresponding to the selected elements being returned.

Another API may be referred to as "getTaskData(row-key)." Based on a row-key, or other identifier, of the selected task, the corresponding task can be retrieved. In some embodiments, a resource associated with the selected task can be retrieved by calling ((JUCtrlHierNodeBinding)selectedObj).getParent( ). The resource, in the illustrated embodiment of interface 300 may be the employee. In some embodiments, the resource is an employee performing the task. The resource may also be a computer system that is performing the task.

Another API may be referred to as "getTaskRow-key( )". This API may return the identifier (or row-key) of the most recently selected task. For example, referring to FIG. 3, if an end-user selects element 330, then element 320, and then element 330, getTaskRow-key( ) would return the row-key (or other identifier) of element 330.

Another API may be referred to as setSelectedTaskRow-keys(Row-keySet). This API may allow an application to provide a set of identifiers such that the corresponding tasks in the scheduling Gantt chart are selected.

The detailed API's represent exemplary API's that may be implemented in ORACLE's ADF (Application Development Framework). It should be understood that similar API's may be implemented in other development frameworks that could allow developers to interrogate multiple elements of a Gantt chart concurrently.

In the illustrated embodiment of interface 300, three elements appearing in different rows are selected in selected group 310. Remaining elements within these rows are not selected. Element 320 and element 330, despite being in rows containing selected elements, are not selected. The selected elements can be interrogated, without affecting the unselected elements present in the same rows as the selected elements of selected group 310, and/or elements present in other rows. For example, the API's may permit a particular characteristic of each element of selected group 310 to be modified concurrently by the end-user. If the end-user modifies the start time and/or date for selected group 310, the start time and/or date for each element may be updated to the new start time and/or date provided by the end-user. Similarly, an end-user may modify the end time and/or date for elements of selected group 310. As another example, the API's may permit an end-user to reassign each element of selected group 310 to a particular employee. The end-user may also be permitted to view characteristics of each element of selected group 310 concurrently. In some embodiments, when the end-user indicates to display characteristics of elements within selected group 310, only characteristics that are in common to all elements within the group may be presented to the end-user.

Figure 4:
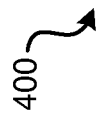
FIG. 4 illustrates an embodiment of an interface displaying a resource utilization Gantt chart having no time buckets selected.

Selections of multiple elements may also be applied to a resource utilization Gantt chart. Embodiments described herein detail API's that allow for multiple elements, such as time buckets, in different rows to be selected and retrieved without an end-user having to provide input to retrieve each time bucket individually. FIG. 4 illustrates an embodiment of an interface 400 displaying a resource utilization Gantt chart having no elements selected. Referring to FIG. 1, interface 400 may be displayed via one of end-user computer systems 120. Some or all of the processing to create the Gantt chart may be performed by one of end-user computer systems 120. In some embodiments, some or all of the processing may be performed by the ERP computer system 110. Gantt chart software 112 may be executed by one of end-user computer systems 120, ERP computer system 110, or partially by both computer systems. Data for elements appearing in the Gantt chart created by Gantt chart software 112 may be retrieved from databases 150. In some embodiments, interface 400 may be created by a system other than system 100 of FIG. 1.

In the Gantt chart of interface 400, no elements are selected. Two rows of the Gantt chart are illustrated. Each row is directed to a particular resource, which, in this embodiment, are employees. Each column within the resource utilization Gantt chart corresponds to a particular day. An element (referred to as a time bucket in a resource utilization Gantt chart) corresponding to a day and an employee reflects the utilization of the employee on that day. Typically, either a single element or an entire row of a resource utilization Gantt chart may be selected at one time. Embodiments described herein allow for multiple time buckets within the same row or in different rows to be selected and interrogated concurrently.

Figure 5:
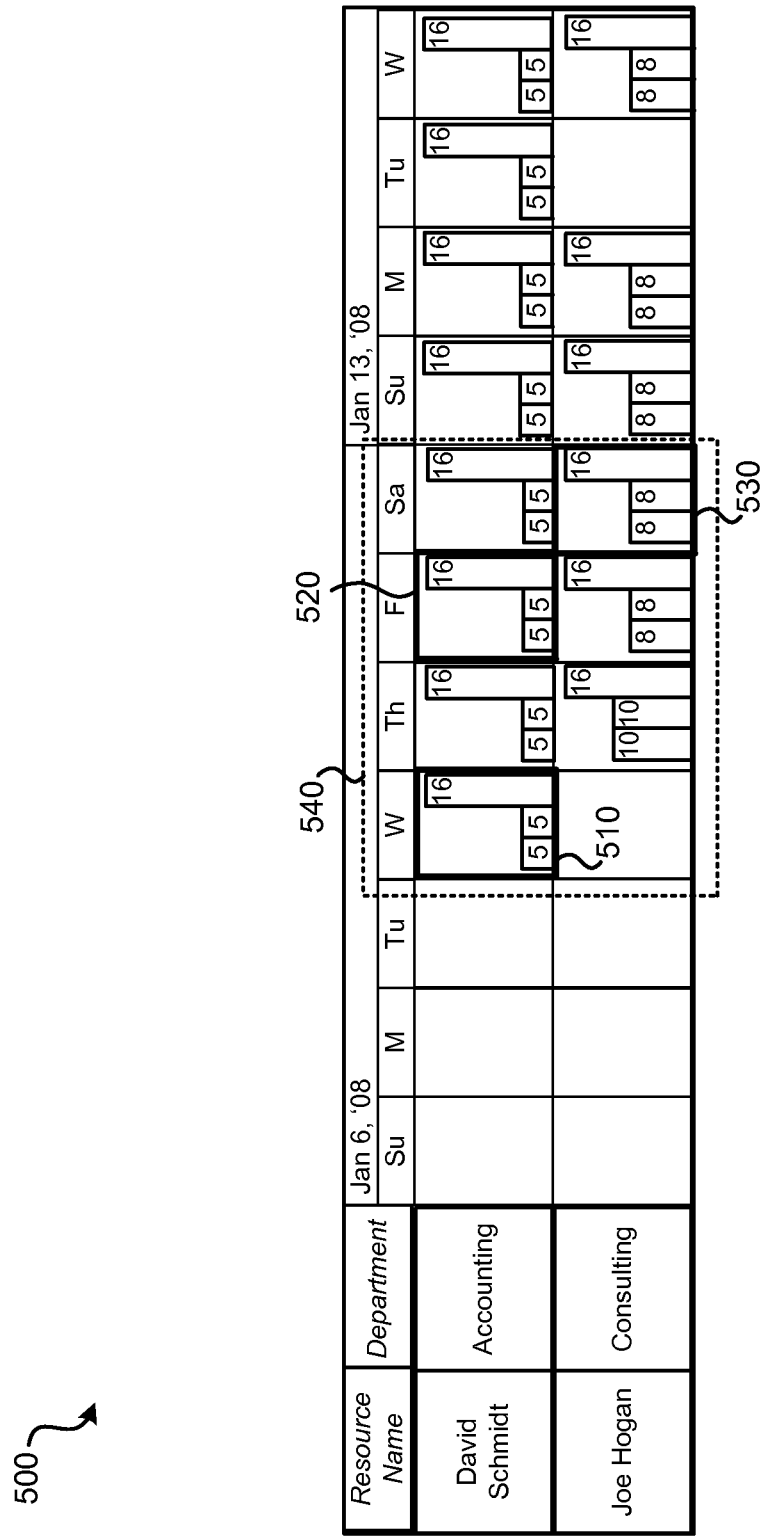
FIG. 5 illustrates an embodiment of an interface displaying a resource utilization Gantt chart having multiple time buckets selected.

FIG. 5 illustrates an embodiment of an interface 500 displaying a resource utilization Gantt chart having multiple time buckets selected. The Gantt chart of FIG. 5 may be the same Gantt chart of interface 400 of FIG. 4 with selections made by an end-user. In this embodiment, three elements are selected: element 510, element 520, and element 530. Collectively, these three elements are referred to as selected group 540. The elements besides elements 510, 520, and 530 (including those within the same rows and/or columns) can remain unselected.

In interface 500, three elements are selected to be retrieved, as indicated by the bold outlining of each selected element in selected group 540. To perform such a selection, an end-user may click on each element in selected group 540. In order for each element of selected group 540 to remain selected while the end-user is inputting the selections, the end-user may hold down a key, such as control, on the end-user computer system being operated by the end-user while inputting the selection. It should be understood by those with skill in the art that other ways of an end-user providing input to an end-user computer system to specify which elements of the Gantt chart are to be selected are also possible.

Each element within the resource allocation Gantt chart of interface 500 may be assigned an identifier different from identifiers assigned to other elements of the same Gantt chart. As such, based on an identifier, a particular element can be identified. Similarly, when a particular element is selected, a corresponding identifier can be identified. This identifier may, in some embodiments, be referred to as a row-key.

Various application programming interfaces (APIs), similar to those discussed in relation to scheduling Gantt charts, may be used in conjunction with Gantt chart software to allow for the interrogation of multiple elements of a resource allocation Gantt chart concurrently. One API may be referred to as "getSelectedTimeBucketRow-keys( )" This API may return an identifier set (e.g., a set of row-keys) of the selected time buckets in a resource utilization Gantt chart. As such, executing this API when the elements of selected group 540 are selected may result in a set of the identifiers corresponding to the selected time buckets being returned.

Another API may be referred to as "getTimeBucketData (row-key)." Based on a row-key (or other identifier) of the selected task, characteristics of the corresponding time bucket can be retrieved. In some embodiments, a resource associated with the selected time bucket can be retrieved efficiently by calling ((JUCtrlHierNodeBinding)selectedObj).getParent( ). The resource, in the illustrated embodiment of interface 500 may be the employee. In some embodiments, the resource is an employee. In some embodiments, the resource may be a computer system.

Another API may be referred to as "getTimeBucketRowkey( )". This API may return the identifier (or row-key) of the most recently selected task to the application executing the API. For example, referring to FIG. 3, if an end-user selects element 510, then element 520, and then element 530, getTimeBucketRow-key( ) would return the identifier (or row-key) of element 530.

Another API may be referred to as "setSelectedTimeBucketRow-keys(Row-keySet)." This API allows an application to set a Row-keySet of tasks in a resource utilization Gantt chart to select them.

Figure 6:
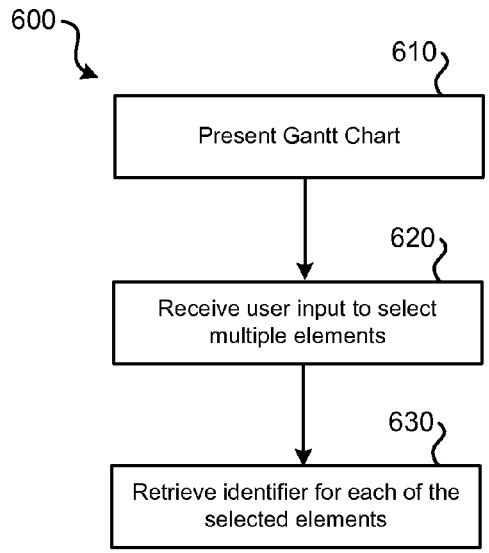
FIG. 6 illustrates an embodiment of method for retrieving identifiers for multiple elements of a Gantt chart.

System 100 of FIG. 1 may be used to interrogate various elements presented to an end-user via the interfaces of FIGS. 2-5. System 100 of FIG. 1 may be used to perform various methods for interacting with multiple elements of a Gantt chart concurrently. FIG. 6 illustrates an embodiment of method 600 for retrieving identifiers for multiple elements of a Gantt chart concurrently. Method 600 may be performed using system 100 of FIG. 1. Each step of method 600 may be performed by a computer system. Referring to system 100 of FIG. 1, each step of method 600 may be performed by an end-user computer system of end-user computer systems 120, ERP computer system 110, or by some combination thereof. Method 600 may also be performed using some other system capable of interrogating multiple elements of a Gantt chart concurrently. Method 600 may be performed on a scheduling Gantt chart or a resource utilization Gantt.

At step 610, a Gantt chart may be displayed to an end-user via an electronic display. The Gantt chart may be displayed using an end-user computer system. The display of the Gantt chart may appear similar to the scheduling Gantt chart of interface 200 of FIG. 2 or may appear similar to the resource allocation Gantt chart of interface 400 of FIG. 4. The Gantt chart displayed at step 610 may also be some other form of Gantt chart. Display of the Gantt chart may allow an end-user to interact with various elements of the Gantt chart.

At step 620, input may be received from the end-user that selects multiple elements (e.g., time buckets or tasks) of the Gantt chart. Some or all of the selected elements may be in the same or different rows. Once selected, the elements selected at step 620 may appear highlighted to the end-user, such as the selected elements appearing bolded.

At step 630, an identifier may be retrieved for each of these selected elements. Each identifier may be a row-key. In order to retrieve the row keys corresponding to the selected elements, an API may be called. Referring to the previously described API's, an API called "getSelectedTaskRowkeys( )" may be executed in order to return a set of identifiers corresponding to the selected elements. As should be understood, API "getSelectedTaskRow-keys( )" represents an exemplary embodiment of an API for returning identifiers of selected Gantt chart identifiers, other embodiments of an API that returns identifiers corresponding to selected elements of a Gantt chart may also be used.

Figure 7:
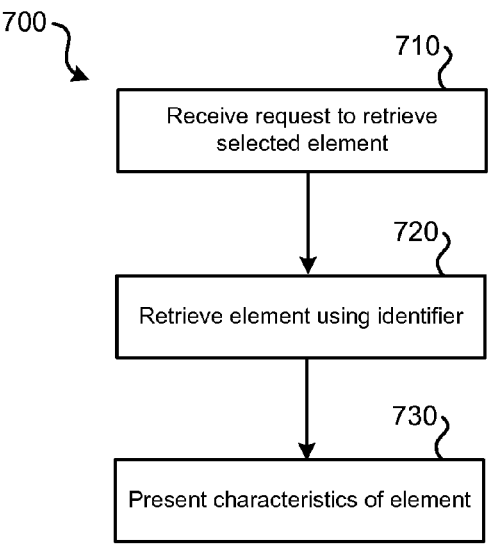
FIG. 7 illustrates an embodiment of method for retrieving an element of a Gantt chart using an identifier.

FIG. 7 illustrates an embodiment of method 700 for retrieving an element of a Gantt chart using an identifier. Method 700 may be performed using system 100 of FIG. 1. Each step of method 700 may be performed by a computer system. Referring to system 100 of FIG. 1, each step of method 700 may be performed by an end-user computer system of end-user computer systems 120, ERP computer system 110, or by some combination thereof. Method 700 may also be performed using some other system capable of retrieving an element of a Gantt chart using an identifier. Method 700 may be performed on a scheduling Gantt chart or a resource utilization Gantt.

At step 710, the request may be received to retrieve a selected element. Retrieving a selected element may involve various characteristics about the element being retrieved, such as from one or more databases. Referring to FIG. 1, such characteristics may be retrieved from databases 150. The request may be received from an end-user. The end-user may have provided input, such as by clicking on an element, that indicates the element is to be retrieved and presented to the end-user, such as via an end-user computer.

At step 720, the element may be retrieved using an identifier, such as a row-key. The retrieval of the element may involve an application, such as Gantt chart software, using an API to retrieve the element. An identifier (e.g., row-key) may be provided to an API such as getTaskData(row-key) or getTimeBucketData(row-key) in order to retrieve the element along with the element's characteristics.

At step 730, the element and its characteristics retrieved at step 720 may be presented to the end-user. The end-user may be able to view and/or modify characteristics of the element. Changes made to the element by the end-user may be updated in appropriate databases and may involve the use of one or more other API's.

Figure 8:
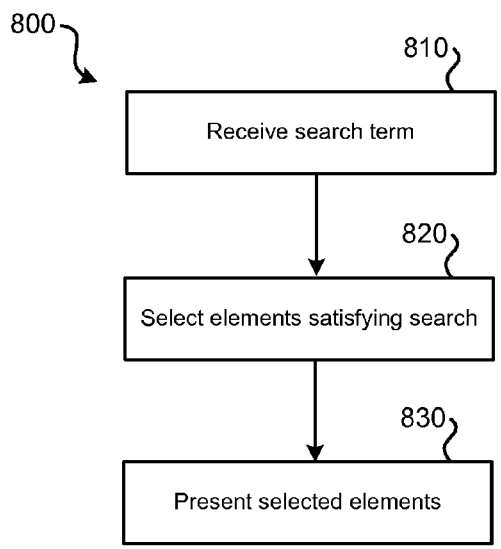
FIG. 8 illustrates an embodiment of method for selecting multiple elements of a Gantt chart using identifiers.

FIG. 8 illustrates an embodiment of method 800 for selecting multiple elements of a Gantt chart using identifiers. Method 800 may be performed using system 100 of FIG. 1. Each step of method 800 may be performed by a computer system. Referring to system 100 of FIG. 1, each step of method 800 may be performed by an end-user computer system of end-user computer systems 120, ERP computer system 110, or by some combination thereof. Method 800 may also be performed using some other system capable of selecting multiple elements of a Gantt chart using identifiers. Method 800 may be performed on a scheduling Gantt chart or a resource utilization Gantt.

At step 810, one or more search terms may be received from an end-user. These search terms may be provided by the end-user in order to identify various elements of a Gantt chart that meet various qualifications. For example, a search may be performed for all elements that pertain to "material orders."

At step 820, elements satisfying the search terms received at step 810 may be selected. In order to select various elements as satisfying the search, an API such as setSelectedTaskRow-keys(Row-keySet) or setSelectedTimeBucketRow-keys(Row-keySet) may be used. An application may provide a set of row-keys or other identifiers to the API. The API may then select the elements corresponding to the provided row-keys. At step 830, the selected elements may be presented to the end-user. The selected elements may appear highlighted, such as by being bolded, as displayed to the end-user.

Figure 9:
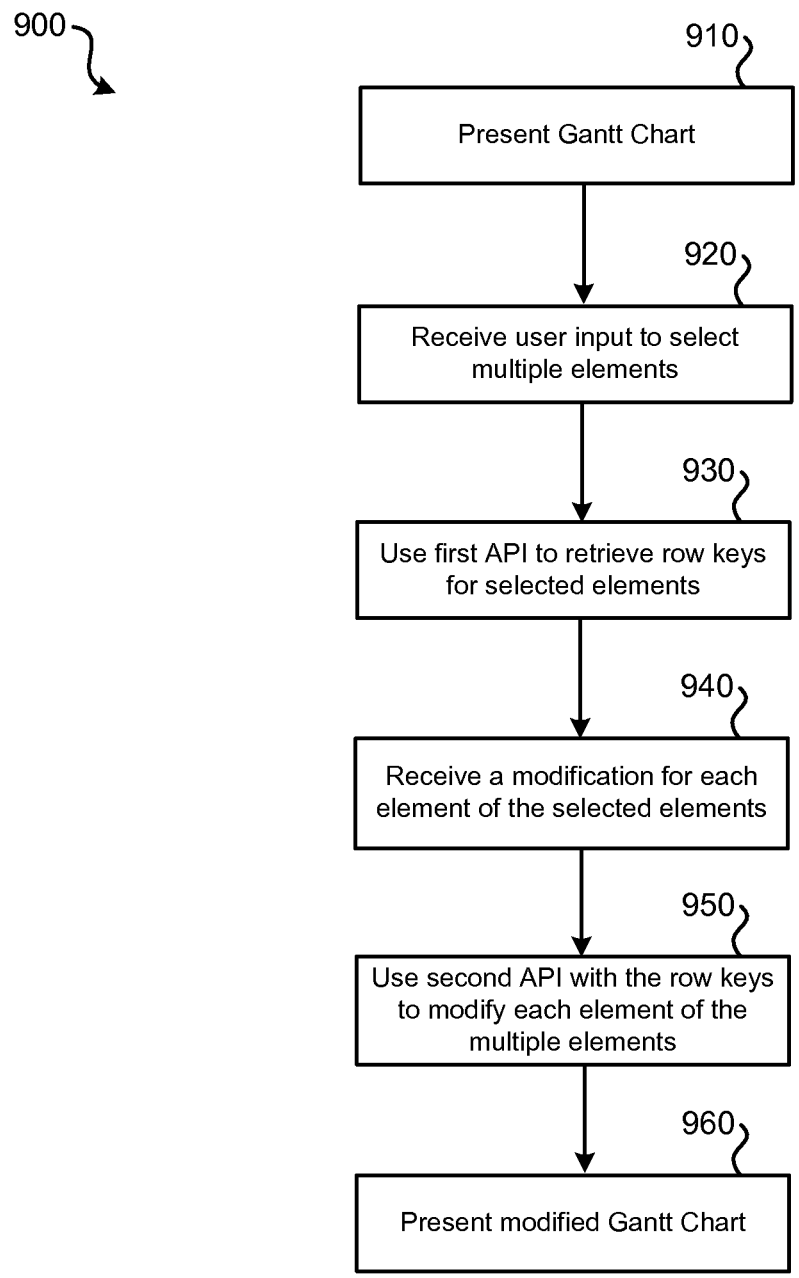
FIG. 9 illustrates an embodiment of method for modifying multiple elements of a Gantt chart concurrently.

FIG. 9 illustrates an embodiment of method 900 for modifying multiple elements of a Gantt chart concurrently.

Method 900 may be performed using system 100 of FIG. 1. Each step of method 900 may be performed by a computer system. Referring to system 100 of FIG. 1, each step of method 900 may be performed by an end-user computer system of end-user computer systems 120, ERP computer system 110, or by some combination thereof. Method 900 may also be performed using some other system capable of selecting multiple elements of a Gantt chart using identifiers. Method 900 may be performed on a scheduling Gantt chart or a resource utilization Gantt.

At step 910, a Gantt chart may be displayed via an electronic display. The Gantt chart may be displayed via an end-user computer system to an end-user. The display to Gantt chart may appear similar to the scheduling Gantt chart of interface 200 of FIG. 2 or may appear similar to the resource allocation Gantt chart of interface 400 of FIG. 4. The Gantt chart displayed at step 910 may also be some other form of Gantt chart. Display of the Gantt chart may allow an end-user to interact with various elements of the Gantt chart.

At step 920, input may be received from the end-user that selects multiple elements (e.g., time buckets or tasks) of the Gantt chart. Some or all of the selected elements may be in the same or different rows. Once selected, the elements selected at step 620 may appear highlighted to the end-user, such as the selected elements appearing bolded.

At step 930, a first API may be used to retrieve row keys for the elements indicated as selected by the user input received at step 920. A row-key, or some other form of identifier, may be retrieved for each of these selected elements. Referring to the previously described API's, an API such as "getSelectedTaskRow-keys( )" may be executed in order to return a set of identifiers corresponding to the selected elements to an application. As should be understood, API "getSelectedTaskRow-keys( )" represents an exemplary embodiment of an API for returning identifiers of selected Gantt chart identifiers, other embodiments of an API that returns identifiers corresponding to selected elements of the Gantt chart may also be used. At this stage, a set of identifiers is now stored for the selected elements of the Gantt chart. If the user modifies the selected elements, the identifiers present in the set may be modified accordingly.

At step 940, a modification may be received from the end-user that is to be used to modify a characteristic of each of the selected elements. A modified characteristic may be received from the user that is to be applied to each selected element. For example, the end-user may provide a modified start date for the selected elements. As such, the start date of each of the selected elements may be set to the modified start date. The end-user may only need to specify the modified start date once for the selected group. The end-user may, for example, provide a modified end date or reassign the selected elements to another person. Other characteristics may also be modified.

At step 950, a second API may be used to apply the modification received at step 940 to the elements selected at step 920. The row-keys, or other identifiers, retrieved at step 930 may be used in conjunction with another API to modify the selected elements. The selected elements may be retrieved using the set of row-keys or other identifiers retrieved at step 930. An API such as "getTaskData(row-key)" or "getTimeBucketData(row-key)" may be used in order to retrieve the element along with the element's characteristics. The characteristics of the elements selected can then be modified in accordance with the modification received at step 940. Modification of the elements at step 950 may involve accessing one or more remote or local databases, such as databases 150 of FIG. 1. This API may also be used to provide additional information for the elements represented by the row-keys.

At step 960, once the selected elements have been modified, the modified Gantt chart may be presented to the end-user. This may involve the Gantt chart being rendered in accordance with the modifications to the selected elements.

Figure 10:
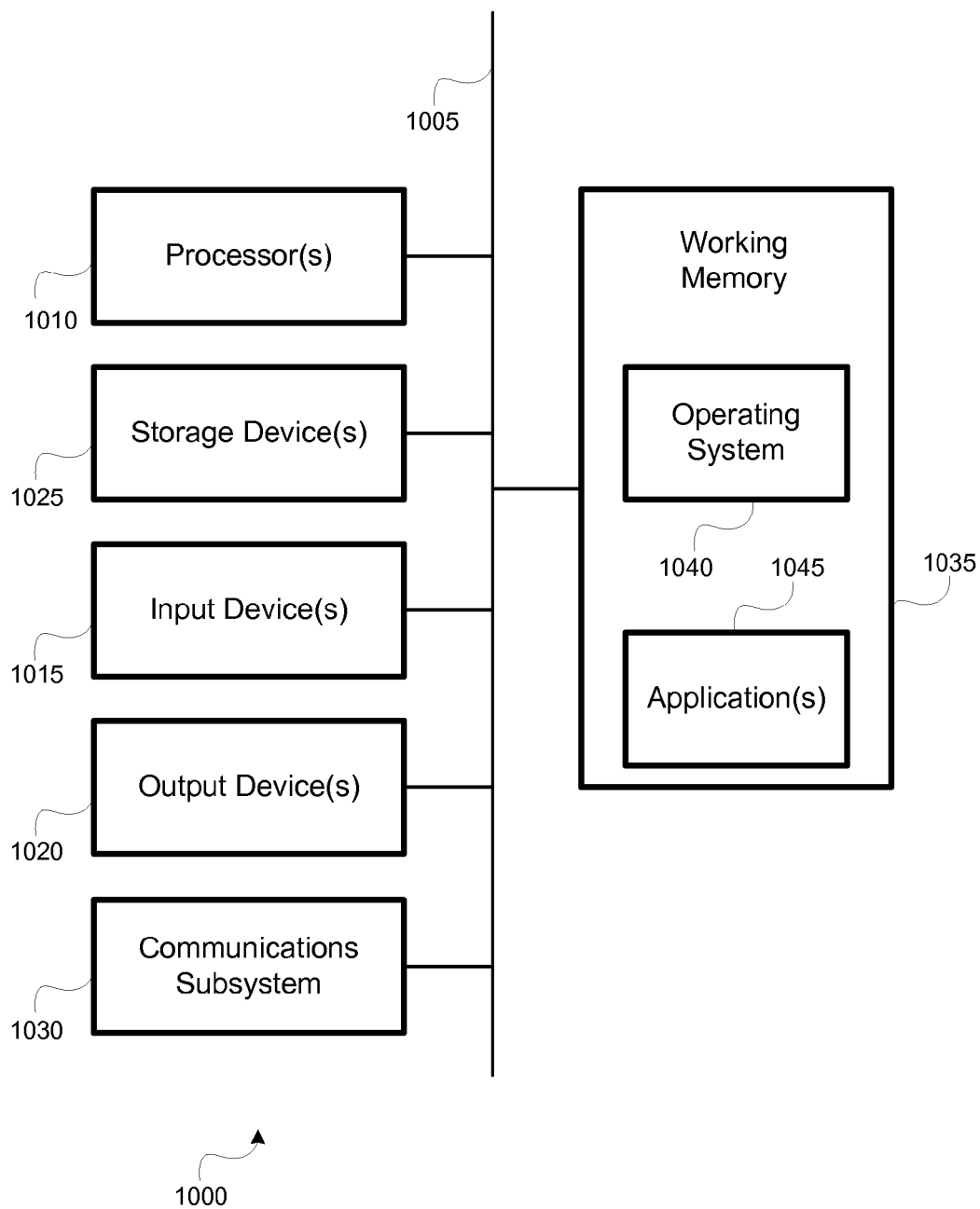
FIG. 10 illustrates an embodiment of a computer system.

Such manipulation of a Gantt chart may be performed by a computer system. FIG. 10 illustrates an embodiment of a computer system which may allow the previously described methods to be performed and interfaces to be created. Computer system 1000 may represent each end-user computer system, the ERP computer system, and/or the developer computer system of system 100 of FIG. 1. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, solid-state storage device such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for manipulating multiple elements of a Gantt chart, the method comprising:
generating, by a computer system, the Gantt chart comprising a plurality of elements distributed across a plurality of groups, wherein:
a first element and a second element of the plurality of elements are present in a first group, the first group being associated with a first person; and
a third element of the plurality of elements is present in a second group, the second group being associated with a second person;
receiving, by the computer system, a selection of the first element associated with the first person and the third element associated with the second person, wherein:
the second element is not selected;
executing, by the computer system, a first application programming interface to retrieve a first element identifier for the first element associated with the first person and a second element identifier for the third element associated with the second person of the Gantt chart, wherein each element identifier corresponds to only one element of the Gantt chart.

2. The method for manipulating multiple elements of the Gantt chart of claim 1, further comprising:
receiving a modification to be applied to the first element and the third element; and
executing a second application programming interface using the first element identifier and the third element identifier to apply the modification to the first element and the third element each element.

3. The method for manipulating multiple elements of the Gantt chart of claim 2, wherein:
the plurality of elements are a plurality of tasks; and
the modification comprises altering a date for the first element and the third element.

4. The method for manipulating multiple elements of the Gantt chart of claim 1, further comprising:
executing a second application programming interface using the first element identifier and the third element identifier to retrieve information about the first element and the third element.

5. The method for manipulating multiple elements of the Gantt chart of claim 1, wherein each group of the plurality of groups of the Gantt chart is a row of the Gantt chart.

6. The method for manipulating multiple elements of the Gantt chart of claim 1, wherein the first group comprises at least one element of the plurality of elements that is not selected.

7. The method for manipulating multiple elements of the Gantt chart of claim 1, wherein the plurality of elements are a plurality of time buckets.

8. A computer program product residing on a non-transitory processor-readable medium and comprising processor-readable instructions configured to cause a processor to:
cause a Gantt chart comprising a plurality of elements distributed across a plurality of groups to be generated, wherein:
a first element and a second element of the plurality of elements are present in a first group; and
a third element of the plurality of elements is present in a second group;
receive a selection of the first element and the third element; wherein:
the second element is not selected;
the subset of elements of the Gantt chart comprises elements from at least a first group and a second group of the plurality of groups of the Gantt chart; and
execute a first application programming interface to retrieve a first element identifier for the first element and a second element identifier for the third element of the Gantt chart, wherein each element identifier corresponds to only one element of the Gantt chart.

9. The computer program product of claim 8, wherein the processor-readable instructions further comprise processor-readable instructions configured to cause the processor to:
receive a modification to be applied to the first element and the third element; and
execute a second application programming interface using the first element identifier and the third element identifier to apply the modification to the first element and the third element.

10. The computer program product of claim 9, wherein
the plurality of elements are a plurality of tasks; and
the modification comprises altering a date for the first element and the third element.

11. The computer program product of claim 8, wherein the processor-readable instructions further comprise processor-readable instructions configured to cause the processor to:
execute a second application programming interface using the first element identifier and the third element identifier to retrieve information about the first element and the third element.

12. The computer program product of claim 8, wherein each group of the plurality of groups of the Gantt chart is a row of the Gantt chart.

13. The computer program product of claim 8, wherein the first group comprises at least one element of the plurality of elements that is not selected.

14. The computer program product of claim 8, wherein the plurality of elements are a plurality of time buckets.

15. A system for manipulating multiple elements of a Gantt chart, the system comprising:
a processor; and
a memory communicatively coupled with and readable by the processor and having stored therein a series of processor-readable instructions which, when executed by the processor, cause the processor to:
cause the Gantt chart comprising a plurality of elements distributed across a plurality of groups to be generated, wherein:
a first element and a second element of the plurality of elements are present in a first group; and
a third element of the plurality of elements is present in a second group;
receive a selection of the first element and the third element; wherein:
the second element is not selected;
the subset of elements of the Gantt chart comprises elements from at least a first group and a second group of the plurality of groups of the Gantt chart; and
execute a first application programming interface to retrieve a first element identifier for the first element and a second element identifier for the third element of the Gantt chart, wherein each element identifier corresponds to only one element of the Gantt chart.

16. The system for manipulating multiple elements of the Gantt chart of claim 15, wherein the series of processor-readable instructions further comprise processor-readable instructions configured to cause the processor to:
receive a modification to be applied to the first element and the third element; and execute a second application programming interface using the first element identifier and the third element identifier to apply the modification to the first element and the third element.

17. The system for manipulating multiple elements of the Gantt chart of claim 16, wherein
the plurality of elements are a plurality of tasks, and
the modification comprises altering a date for the first element and the third element.

18. The system for manipulating multiple elements of the Gantt chart of claim 15, wherein the series of processor-readable instructions further comprise processor-readable instructions configured to cause the processor to:
execute a second application programming interface using the first element identifier and the third element identifier to retrieve information about the first element and the third element.

19. The system for manipulating multiple elements of the Gantt chart of claim 15, wherein each group of the plurality of groups of the Gantt chart is a row of the Gantt chart.

20. The system for manipulating multiple elements of the Gantt chart of claim 15, wherein the first group comprises at least one element of the plurality of elements that is not selected.

* * * * *

UNITED STATES PATENT AND TRADEMARK OFFICE
CERTIFICATE OF CORRECTION

PATENT NO. : 8,952,966 B2
APPLICATION NO. : 13/224585
DATED : February 10, 2015
INVENTOR(S) : Mohammad et al.

It is certified that error appears in the above-identified patent and that said Letters Patent is hereby corrected as shown below:

References Cited

On page 2, in column 1, under other publications, line 7, delete "Horne.aspx," and insert -- Home.aspx, --, therefor.

On page 2, in column 1, under other publications, line 9, delete "dhtmixgantt:" and insert -- dhtmlxgantt: --, therefor.

On page 2, in column 1, under other publications, line 11, delete "JavaScrit" and insert -- JavaScript --, therefor.

On page 2, in column 1, under other publications, line 13, delete "dhtmixGantt" and insert -- dhtmlxGantt --, therefor.

In the Specification

In column 7, line 13, delete "keys( )"" and insert -- keys( )." --, therefor.

In column 8, line 66, delete "keys( )"" and insert -- keys( )." --, therefor.

In the Claims

In column 15, line 32, in claim 2, delete "element each element." and insert -- element. --, therefor.

In column 15, line 62-63, in claim 8, delete "element;" and insert -- element, --, therefor.

In column 16, line 51, in claim 15, delete "element;" and insert -- element, --, therefor.

Signed and Sealed this
Seventeenth Day of November, 2015

Michelle K. Lee
*Director of the United States Patent and Trademark Office*